(12) United States Patent
Chou

(10) Patent No.: US 6,867,960 B2
(45) Date of Patent: Mar. 15, 2005

(54) POWER SUPPLY GUIDE DEVICE OF COMPUTER HOST

(75) Inventor: Chi Wen Chou, Taipei (TW)

(73) Assignee: First International Computer Inc., Taipei (TW)

( * ) Notice: Subject to any disclaimer, the term of this patent is extended or adjusted under 35 U.S.C. 154(b) by 50 days.

(21) Appl. No.: 10/622,578

(22) Filed: Jul. 21, 2003

(65) Prior Publication Data

US 2005/0018387 A1 Jan. 27, 2005

(51) Int. Cl.[7] ................................................ H05K 7/00
(52) U.S. Cl. ........................ 361/679; 361/696; 710/303; 345/168
(58) Field of Search .................................. 361/679–687, 361/724–727, 690, 695, 696–697, 700–704; 710/303, 304; 345/157, 168–169; 364/708.1

(56) References Cited

U.S. PATENT DOCUMENTS 5,861,873 A * 1/1999 Kikinis ........................ 345/157
6,563,703 B2 * 5/2003 Xie ............................. 361/687
6,577,501 B2 * 6/2003 Lin ............................. 361/686

* cited by examiner

Primary Examiner—Hung Van Duong
(74) Attorney, Agent, or Firm—Rosenberg, Klein & Lee

(57) ABSTRACT

A power supply guide device of a computer host is provided as a connection structure between a power supply and a computer case. The power supply guide device comprises a computer case and a power supply placement device. A first guide device is provided on the horizontal plane of the computer case. A first pivotal portion and a second pivotal portion are located at the upper end and the lower end of the vertical plane of the computer case, respectively. The power supply placement device has a space for placing the power supply. A first fastening device above the power supply placement device is fastened with the first guide device. The first pivotal device and the second pivotal device are respectively connected with the first pivotal portion and the second pivotal portion so that the power supply placement device can be pivotally connected with the computer case.

8 Claims, 8 Drawing Sheets

POWER SUPPLY GUIDE DEVICE OF COMPUTER HOST

FIELD OF THE INVENTION

The present invention relates to a power supply guide device of a computer host and, more particularly, to a structure for installing a power supply into a computer case. The power supply guide device makes use of a computer case and a power supply placement device to facilitate installation of the power supply into the computer case.

BACKGROUND OF THE INVENTION

Generally, a power supply is installed on a conventional computer case. The power supply is firmly installed on the computer case by screwing. Because the power supply is heavy, many screwing components are required if the power supply is firmly installed on the computer case by screwing. Moreover, the difficulty in assembly is high. When the power supply is to be assembled or replaced, the process is also very inconvenient.

Furthermore, because a computer motherboard is generally located on the same plane of the power supply and the power supply is large, when the motherboard is to be detached for assembling or troubleshooting the CPU or memories, the power supply will block the handling space or it is necessary to detach the power supply, hence causing much inconvenience.

SUMMARY OF THE INVENTION

The primary object of the present invention is to provide a power supply guide device of a computer host, wherein a first fastening device of a power supply placement device is installed in a first guide device on a computer case. The assembly is slipped into one side of the computer case through pivotal connection and then placed into the computer case. Because a guide device is utilized in structure to save effort, it is very easy to detach or assemble the power supply.

The secondary object of the present invention is to provide a power supply guide device of a computer host, wherein an elastic piece is provided above the power supply placement device and a stop portion is provided at the computer case. When the power supply placement device is completely pushed into the computer case, the stop portion and the elastic piece will contact each other so that the power supply placement device can be positioned in the computer case.

Another object of the present invention is to provide a power supply guide device of a computer host, wherein a sheet body is provided between the power supply placement device and the computer case. The sheet body has a recessed portion with a pivot. The sheet body is connected with a first pivotal device of the power supply placement device via the pivot so that a positioning state can be accomplished when the first pivotal device and the pivot are connected together.

The present invention makes use of a power supply placement device to connect a computer case so that a power supply can be quickly and conveniently removed out from the computer case when troubleshooting the motherboard. The present invention makes use of a first guide device, a first pivotal portion and a second pivotal portion on the computer case and a first fastening device, a first pivotal device and a second pivotal device on the power supply placement device. Through the first pivotal portion and the second pivotal portion of the computer case and the first pivotal device and the second pivotal device on the power supply placement device, the power supply can be quickly removed out from the computer case. Moreover, the first guide device of the computer case and the first fastening device of the power supply placement device are fastened together to accomplish the function of guidance and hanging. Besides, through the structure of the first guide device, whether the first fastening device is exactly connected with the first guide device can be easily confirmed.

The various objects and advantages of the present invention will be more readily understood from the following detailed description when read in conjunction with the appended drawing, in which:

DETAILED DESCRIPTION OF THE PREFERRED EMBODIMENTS

The present invention makes use of a computer case and a power supply placement device to solve the problems in the prior art. For example, when the motherboard is to be detached for assembling or troubleshooting the CPU or memories, a user needs to detach a power supply so as to replace a CPU or memories. In the present invention, the power supply can be quickly removed out from the computer case.

Figure 1:
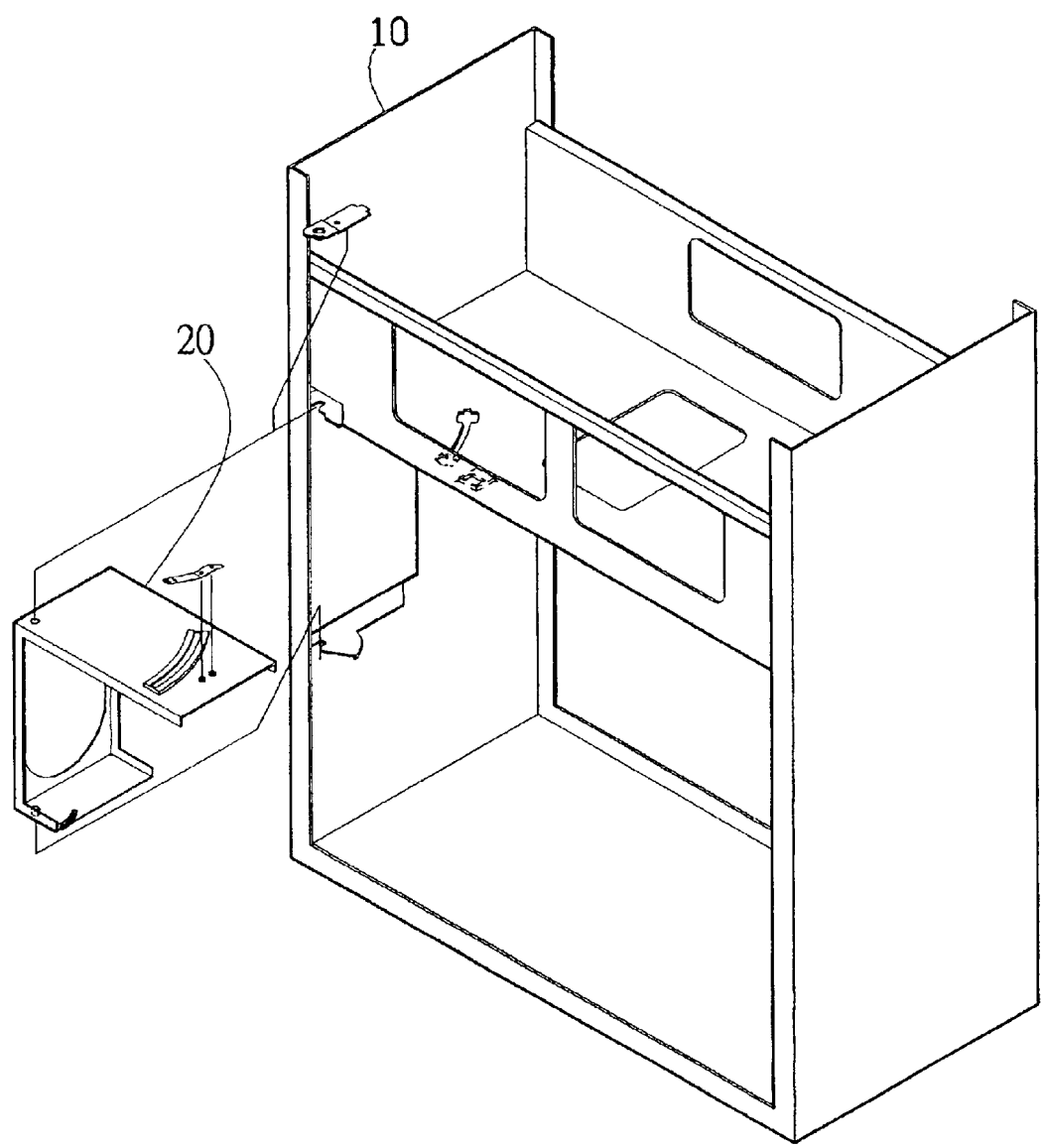
FIG. 1 is an exploded view according to a first preferred embodiment of the present invention.
Figure 2:
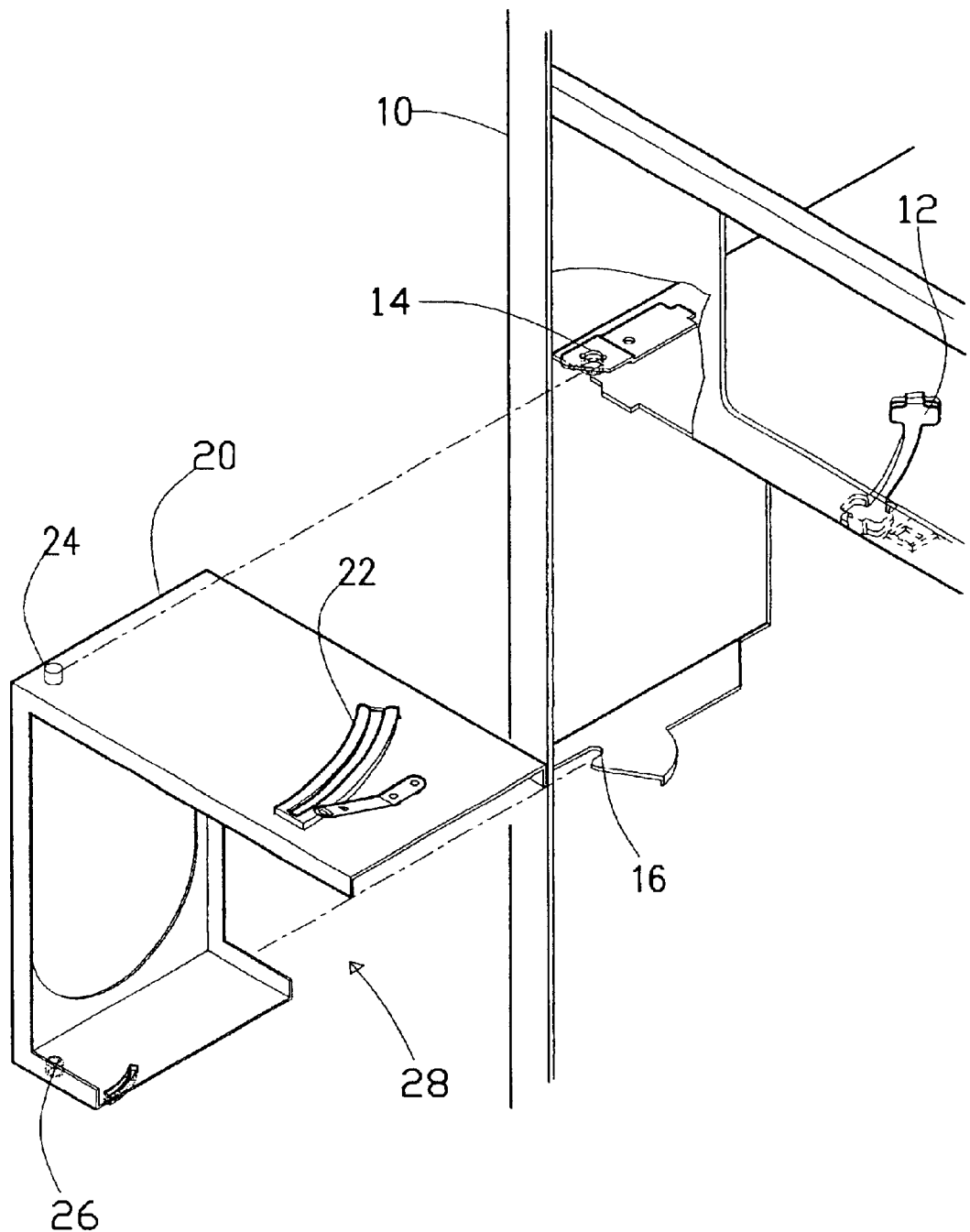
FIG. 2 is a partly exploded view according to the first preferred embodiment of the present invention.

As shown in FIGS. 1 and 2, a power supply guide device of a computer host is a connection structure of a power supply and a computer case. The power supply guide device comprises mainly a computer case 10 and a power supply placement device 20.

The computer case 10 comprises a first guide device 12 located on a horizontal plane of the computer case 10. A first pivotal portion 14 and a second pivotal portion 16 are arranged above and lower the side of the computer case 10, respectively.

The power supply placement device 20 comprises a first fastening device 22, a first pivotal device 24 and a second pivotal device 26. The installation order of the power supply placement device 20 is as below. First, the first pivotal device 24 and the second pivotal device 26 of the power supply placement device 20 are connected with the first pivotal portion 14 and the second pivotal portion 16 of the computer case 10, respectively. A first fastening device 22 is provided above the power supply placement device 20 to be fastened with the first guide device 12 of the power supply placement device 20. Through the above structures, a power supply fixed in a space 28 of the power supply placement device 20 can be quickly installed in or removed out from the computer case 10.

Figure 3:
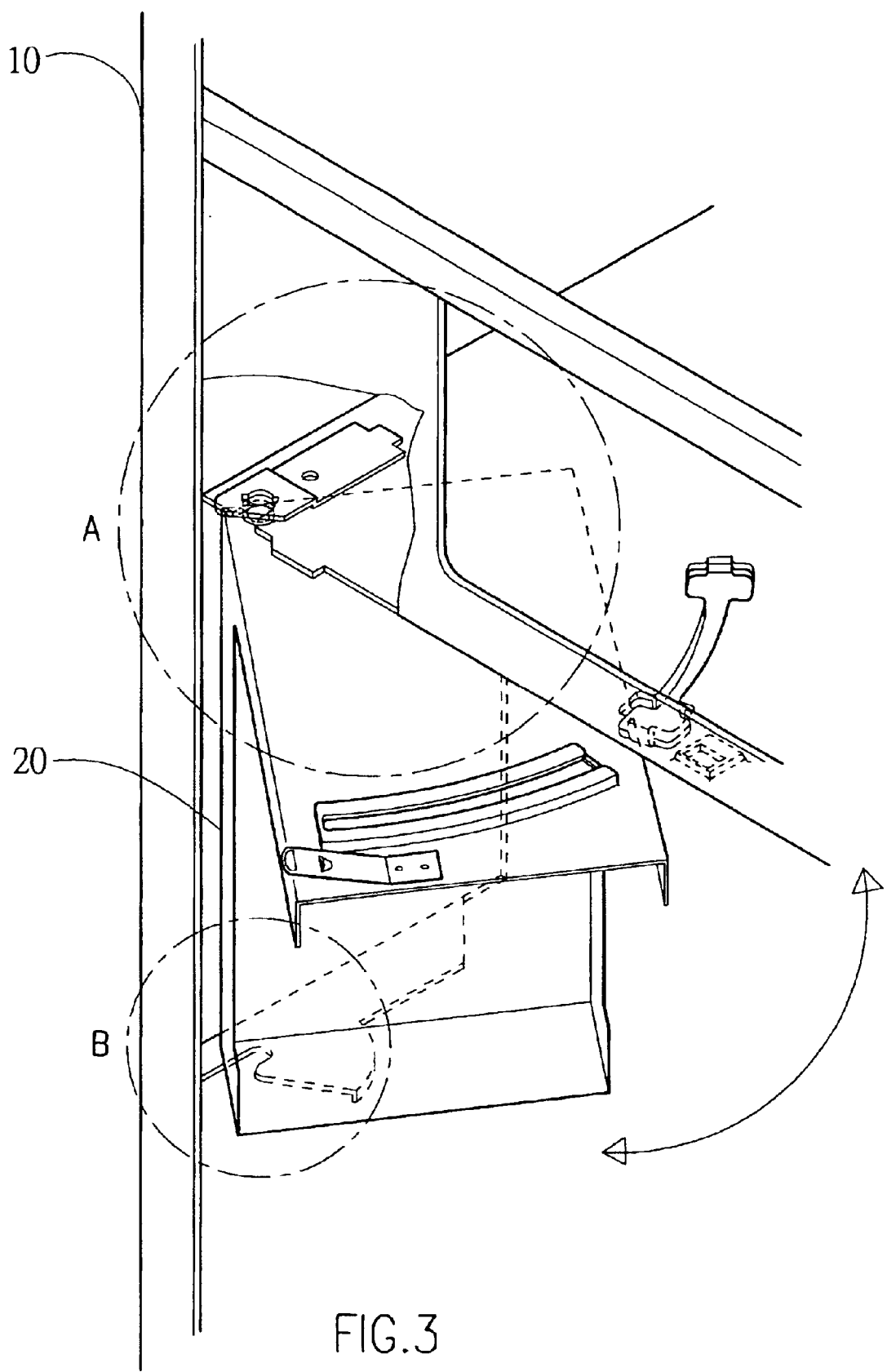
FIG. 3 is a combination diagram according to the first preferred embodiment of the present invention.

As shown in FIG. 3, the power supply placement device 20 of the present invention can be quickly installed in or removed out from the computer case 10. The position of the first fastening device 22 corresponds to that of the first guide device 12 of the computer case 10. The first pivotal device 24 and the second pivotal device 26 of the power supply placement device 20 are pivotally connected with the first pivotal portion 14 and the second pivotal portion 16 of the computer case 10, respectively. The power supply placement device 20 of the present invention can thus be quickly and easily installed in or removed out from the computer case 10.

Figure 4A:
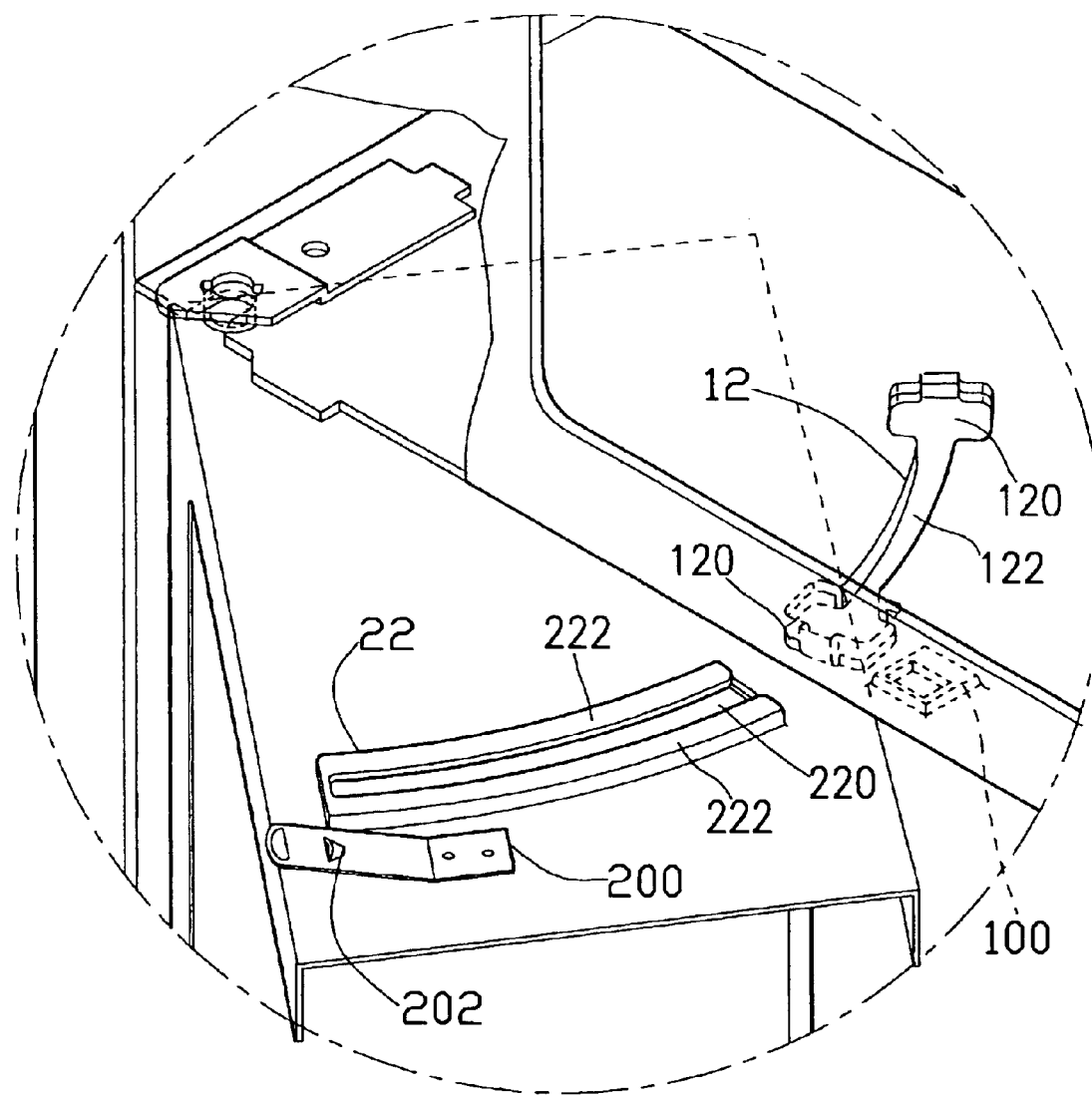
FIG. 4A is a partly enlarged view of part A of the first preferred embodiment of the present invention.
Figure 4B:
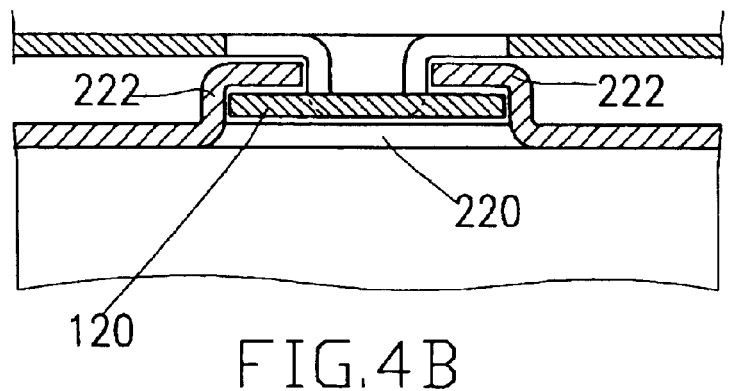
FIG. 4B is an assembly diagram of a first guide device and a first fastening device of the first embodiment of the present invention.

As shown in FIG. 4A, the first guide device 12 of the computer case 10 includes an upper sheet body and a lower sheet body parallel to each other and connected together. The first guide device 12 comprises a fastening projective piece 120 and a central recessed portion 122. The central recessed portion 122 is connected with the computer case 10. The first fastening device 22 of the power supply placement device 20 is of a shape and comprises a central groove portion 220 and an outer edge projective bar 222. Through the structures of the first guide device 12 and the first fastening device 22, the power supply placement device 20 can be fixed, guided and hung at the computer case 10. The two sides of the first fastening device 22 are projective, and the center thereof is the central groove 22. The center of the first guide device 12 is recessed. The central groove 222 of the first fastening device 20 is matched with the central recessed portion 120 of the first guide device 12. When the first fastening device 22 is fastened with the first guide device 12, the outer edge projective bar 222 is fastened with the fastening projective piece 120. As shown in FIG. 4B, whether the outer edge projective bar 222 of the first fastening device 2 is exactly connected with the fastening projective piece 120 of the first guide device 12 can be directly determined from above the first guide device 12 during assembly.

Moreover, an elastic piece 200 is provided above the power supply placement device 20. A stop portion 100 corresponding to the elastic piece 200 is provided on the computer case 10. The stop portion 100 is of an arc projective shape. When the power supply placement device 20 is pivotally moved into the computer case 10, a fixing point 202 of the elastic piece 200 will be fixed on the computer case 10 by the stop portion 100. By pressing downwards the elastic piece 200, the fixing point 202 can be separated from the stop portion 100 to move the power supply placement device 20 out from the computer case 10.

Figure 4C:
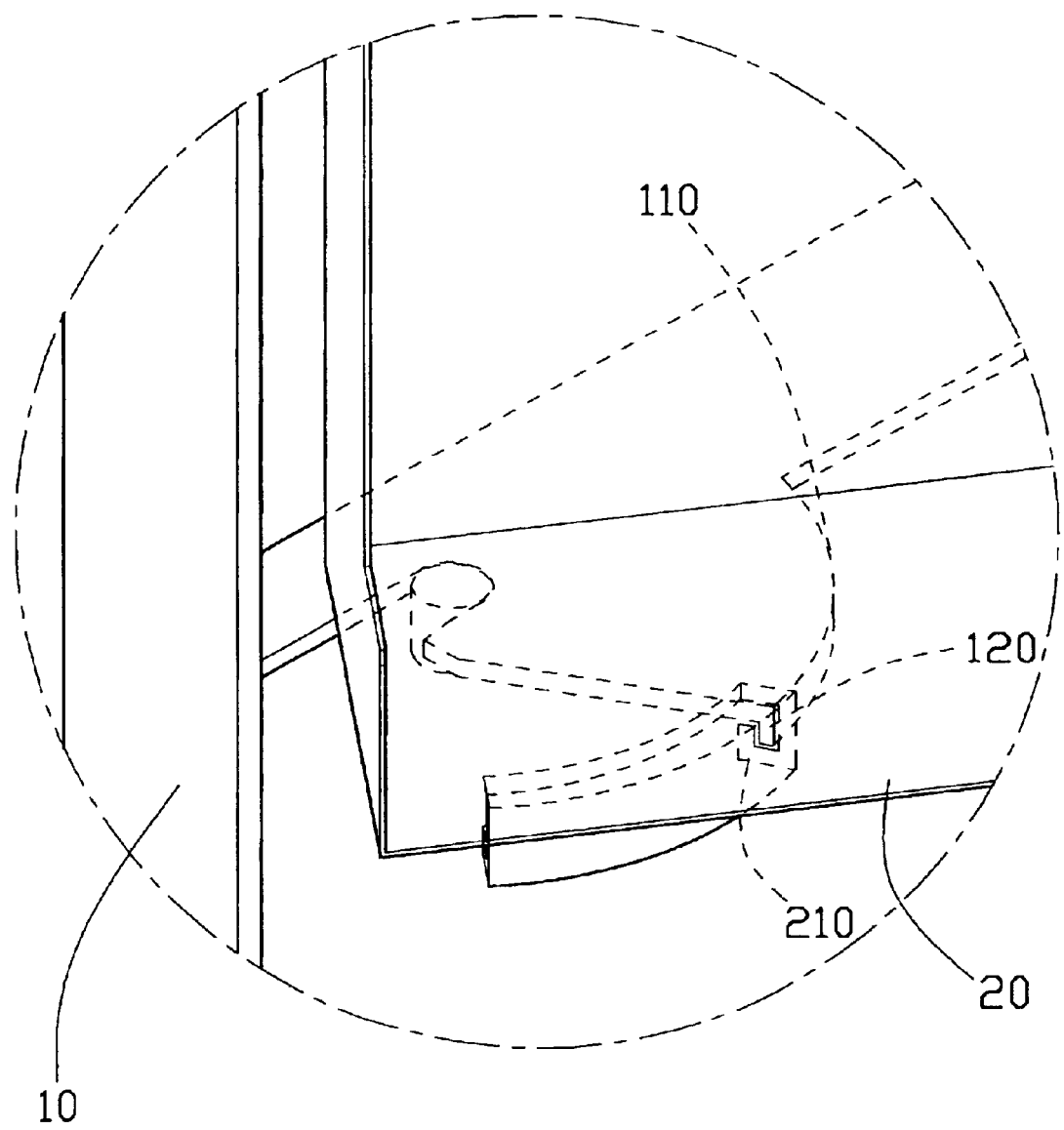
FIG. 4C is partly enlarged view of part B of the first preferred embodiment of the present invention.

As shown in FIG. 4C, a bearing portion 110 is provided below the computer case 10. A second guide device 120 is provided at the distal end of the bearing portion 110. A second fastening device 210 corresponding to the second guide device 120 is arranged on the power supply placement device 20. The second fastening device 210 is of a hooked track shape so that the power supply placement device 20 can be installed in the computer case 10 along the second guide device 120.

Figure 5:
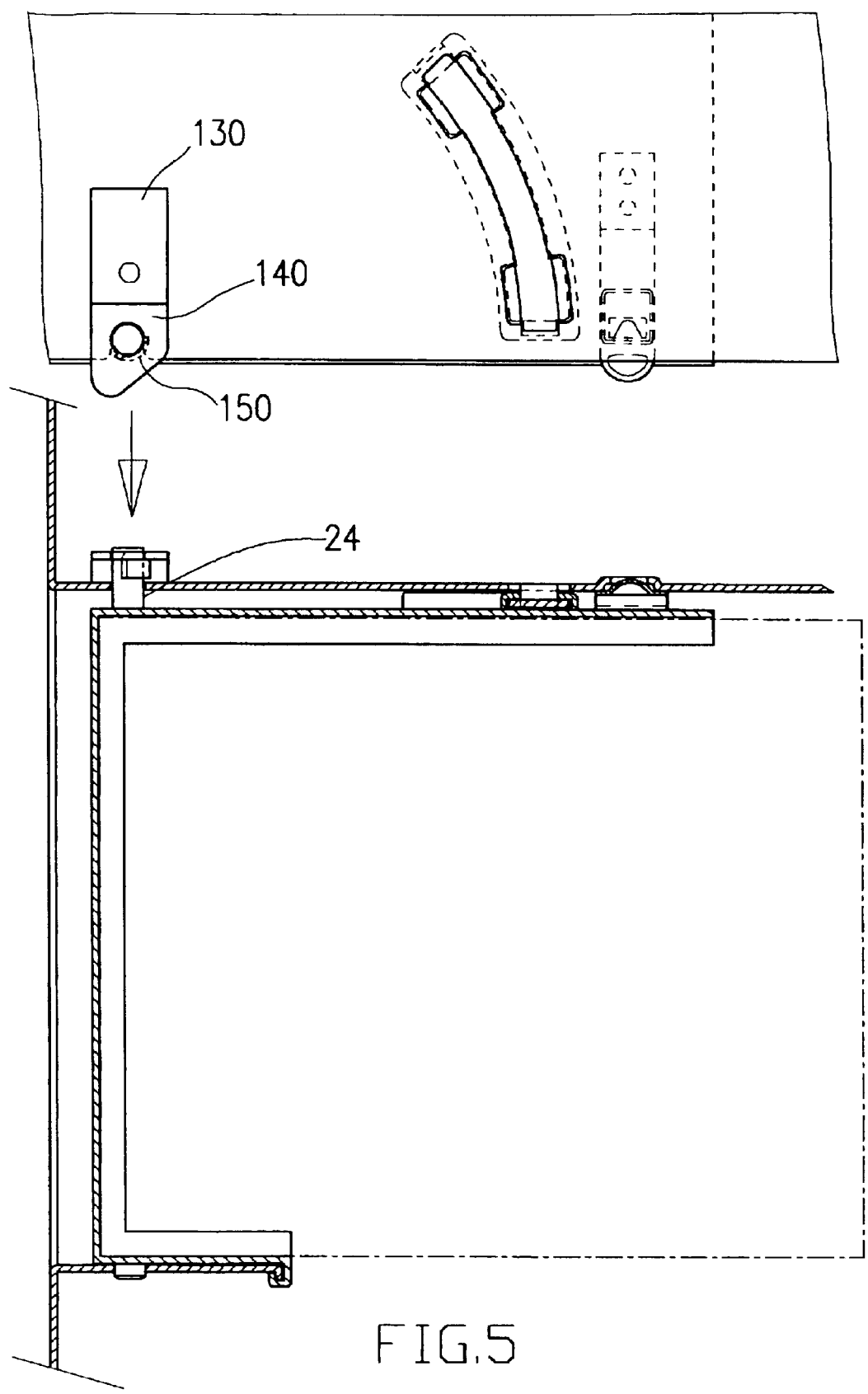
FIG. 5 is a cross-sectional view of the first embodiment of the present invention.
Figure 5A:
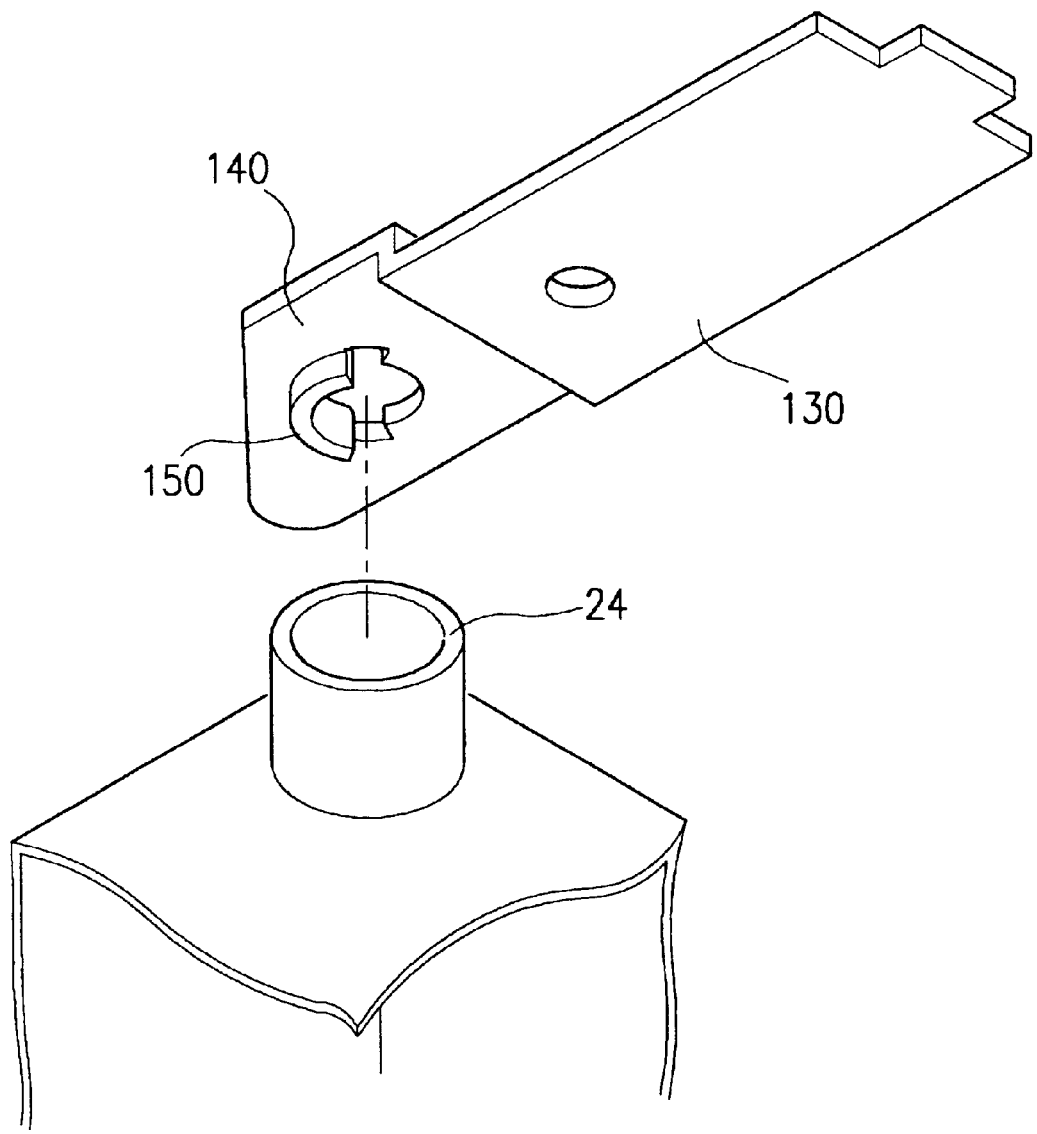
FIG. 5A is an assembly diagram of fastening devices and guide devices of the first embodiment of the present invention.

As shown in FIGS. 4C, 5 and 5A, the first pivotal portion 14 of the computer case 10 has a sheet body 130, whose front has a recessed portion 140. The recessed portion 140 has a pivot 150 protruding downwards. The pivot 150 can be pivotally connected with the first pivotal device 24 of the power supply placement device 20 so that the power supply placement device 20 can be more tightly fixed on the computer case 10. When it is necessary to detach the power supply placement device 20, the recessed portion 140 is first pulled up to move the pivot 150 out from the first pivotal device 24, and the power supply placement device 20 can then be removed out from the computer case 10. Moreover, the sheet body 130 and the pivot 150 are integrally formed, and the downward angle of the pivot 150 is an acute angle to facilitate removal of the first pivotal device 24 of the power supply placement device 20 out from the pivot 150.

Figure 6:
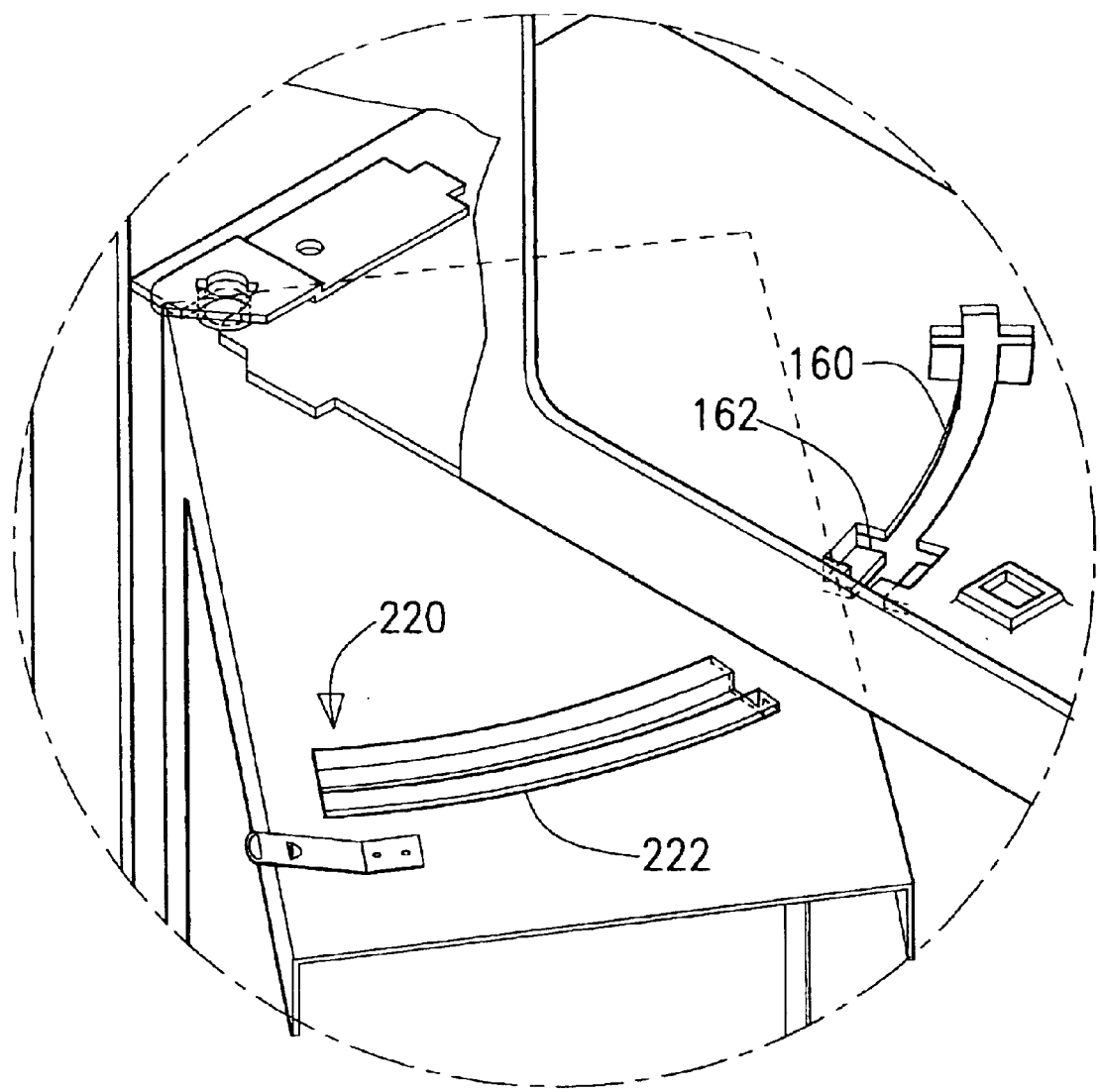
FIG. 6 is a diagram of fastening devices and guide devices of a second embodiment of the present invention.
Figure 6A:
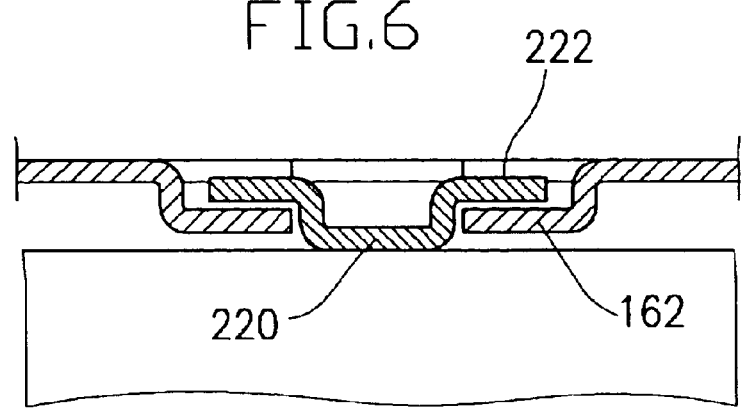
FIG. 6A is an assembly diagram of fastening devices and guide devices of the second embodiment of the present invention.

Finally, as shown in FIGS. 6A and 6B, the first guide device of the computer case and the first fastening device of the power supply placement device can be connected together in another way. A first guide device 160 is of a circular arc shape with a hollow center. Fastening sheets 162 of a recessed horizontal shape are provided at two sides of the distal end of the first guide device 160. Projective wings 222 are provided at two sides of a first fastening device 220. The projective wings 222 are connected with the fastening sheets 162. Whether the first fastening device 220 is exactly connected with the first guide device 160 can be directly determined from above the first guide device 160 during assembly.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

I claim:

1. A power supply guide device of a computer host used as a connection structure between a power supply and a computer case, said power supply guide device comprising:
   a computer case with a first guide device located on a horizontal plane thereof, a first pivotal portion and a second pivotal portion being located at an upper end and a lower end of a vertical plane of said computer case; and
   a power supply placement device having a space for placing said power supply, a first pivotal device and a second pivotal device being respectively connected with said first pivotal portion and said second pivotal portion so that said power supply placement device can be pivotally connected with said computer case, a first fastening device being provided above said power supply placement device to be fastened with said first guide device.

2. The power supply guide device of a computer host as claimed in claim 1, wherein said first pivotal portion has a sheet body, a recessed portion is provided in front of said sheet body, said recessed portion has a pivot protruding downwards, and said sheet body can be connected with said first pivotal device of said power supply placement device via said pivot.

3. The power supply guide device of a computer host as claimed in claim 1, wherein said computer case further comprises a stop portion on the same plane as said first guide device, said stop portion is of an arc projective shape, and an elastic piece is disposed above said power supply placement device.

4. The power supply guide device of a computer host as claimed in claim 1, wherein said second pivotal portion of said computer case further comprises a bearing portion below said computer case to bear the weight at the bottom of said power supply placement device.

5. The power supply guide device of a computer host as claimed in claim 1, wherein said first guide device comprises an upper sheet body and a lower sheet body parallel to each other and connected together, and said sheet bodies can be used to guide and fix said power supply placement device.

6. The power supply guide device of a computer host as claimed in claim 2, wherein said sheet body and said pivot are integrally formed.

7. The power supply guide device of a computer host as claimed in claim 4, wherein said bearing portion further comprises a second guide device at a distal end thereof, and a second fastening device corresponding to said second guide device is provided at said power supply placement device.

8. The power supply guide device of a computer host as claimed in claim 7, wherein said second fastening device is of a hooked track shape so that said power supply placement device can be installed in said computer case along said second guide device.

* * * * *